June 4, 1940.   N. A. METZGER   2,203,631
CONDITION CONTROLLER
Filed Aug. 24, 1938

Inventor
Norman A. Metzger
By George H. Fisher
Attorney

Patented June 4, 1940

2,203,631

UNITED STATES PATENT OFFICE 2,203,631

CONDITION CONTROLLER

Norman A. Metzger, Chicago, Ill., assignor to Minneapolis-Honeywell Regulator Company, Minneapolis, Minn., a corporation of Delaware Application August 24, 1938, Serial No. 226,595

2 Claims. (Cl. 236—51)

This invention relates to condition controllers and more particularly to condition controllers of the type which are adapted for automatic adjustment or for adjustment from a remote point.

In the art of automatic control of temperature or other conditions within buildings it has become common to provide for varying the temperature maintained within a room or space in accordance with outside temperature or other conditions. For example, in summer air conditioning work it has been found desirable to raise the standard of temperature maintained within a conditioned space in accordance with rise in outside temperature. This requires adjustment of the thermostat controlling the space temperature in accordance with outside temperature. One manner of accomplishing this result is by the provision of a motor adjacent the thermostat for mechanically shifting the thermostat adjusting device. Arrangements of this type have been quite satisfactory for thermostats which are located outside of the conditioned space such as in return air ducts for in such locations, appearance of the instrument is not an important factor. However in the past when an adjusting motor has been applied to a space thermostat, the result has been a rather cumbersome and unsightly appearing instrument.

It is an object of this invention to provide a condition controller which is adapted to be located in a space to be controlled and which may be automatically adjusted or adjusted from a remote point, which is small and attractive in appearance.

More specifically it is an object of this invention to provide a space condition controller having a motor device for varying the adjustment thereof, and in which the motor device is located in a space within the wall upon which the instrument is mounted for thereby providing an instrument which is small and attractive appearing from its exterior.

Other objects will appear from the following description and the appended claims.

For a full disclosure of this invention, reference is made to the following detailed description and to the accompanying drawing in which.

Figures 1, 2:
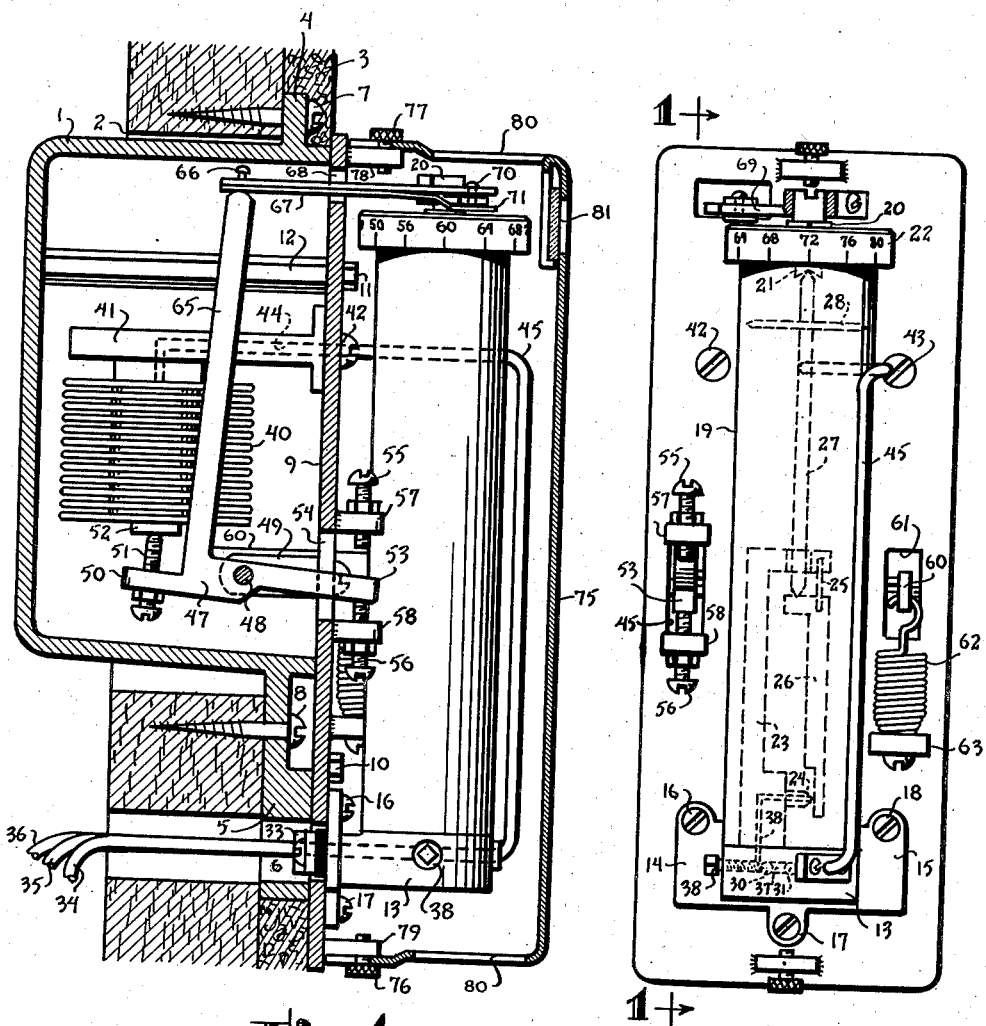
Figure 1 is a side elevation partially in section of the improved instrument, taken on line 1—1 of Figure 2.
Figure 2 is a front elevation with the cover removed.
Figure 3:
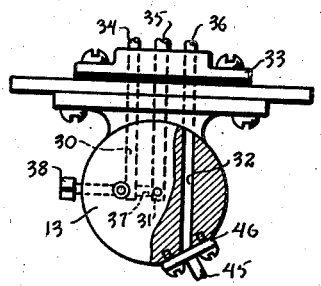
Figure 3 is a part sectional view showing the air connections for the instrument.

Referring now to Figure 1 reference character 1 indicates a wall box for mounting within an opening 2 in the wall 3 upon which the instrument is mounted. The wall box 1 is provided with an upwardly extending ear 4 and with a downwardly extending flange 5 having therein an opening 6. This box is secured to the wall by means of screws 7 and 8. Mounted upon the wall box 1 is a base plate 9 which is secured to the wall box by means of screws 10 and 11. The screw 11, it will be noted, is received in an extension member 12 which is secured to the rear face of the wall box 1.

Mounted upon the base plate 9 is a thermostat base member 13 which is provided with flanges 14 and 15, this base member being secured to the base plate 9 by means of screws 16, 17, and 18. This base member 13 supports a hard rubber tube type thermostatic element 19 which is fitted with a plug member at its top which carries an adjusting screw 20. This adjusting screw 20 has a portion 21 extending within the thermostatic element 19 and also carries a drum type dial 22 for indicating the temperature setting of the instrument.

Mounted upon the base member 13 and located within the thermostatic element 19 is an upstanding member 23 which carries a leak port or nozzle 24. This member 23 also supports a spring hinge member 25 for a flapper valve member 26 formed in the shape of a bell crank. This flapper valve member is actuated by a rod 27 the upper end of which is received in the portion 21 of the adjusting screw 20. This member 27 also is provided with a guide member 28. Upon a decrease in temperature surrounding the thermostatic element 19, this element will contract which causes downward movement of its upper end and the adjusting screw 21. This in turn forces the member 27 downwardly thereby rocking the flapper valve 26 to the right thus shifting it away from the leak port 24, and allowing air to leak to atmosphere. Upon an increase in temperature opposite movement of the parts will take place for causing the flapper valve 26 to approach the leak port 24.

The base member 13 is provided with passages 30, 31, and 32. These passages are connected by means of a fitting 33 to an air supply line 34, branch line 35, and a master control line 36, these lines extending through the opening 6 in the extension 5 of the wall box member 1. The passages 30 and 31 are connected together by a cross passage 37 which is also connected to a passage 38 leading to the leak port 24. This passage 37 also accommodates a restriction screw 38 which restricts the flow of air from the air supply passage 30 into passage 31 and leak port 24. Due to the action of the restricting screw 38 in restricting the supply of air to the leak port and branch line 35, the pressure in the branch line 35 is caused to vary in accordance with changes in temperature at the thermostat. No novelty is claimed in the particular type thermostat illustrated for this type of thermostat is well known in the art.

Located within the wall box 1 is an adjusting motor device consisting of a bellows 40 which is mounted upon a bracket member 41 secured to the rear face of the base plate 9 by means of screws 42 and 43. This bracket member 41 contains an air passage 44 communicating with the interior of the bellows 40 and with a tube 45 leading to the base member 13 and communicating with the passage 32 therein. As shown the tube 45 is secured to the base member 13 by means of a clamping member 46. In this manner the interior of the bellows 40 communicates with the master control line 36, and changes in pressure within this control line will be communicated to the interior of the bellows.

The bellows 40 actuates a lever member 47 which is pivoted at 48 between extensions 49 forming a part of the base plate 9. The lever member 47 includes a portion 50 which carries an adjusting screw 51 adapted for engagement with the head 52 of the bellows 40. The lever member 47 also is provided with a portion 53 which extends forwardly and through an opening 54 in the base plate 9. The portion 53 cooperates with a pair of stop screws 55 and 56 which are carried by ears 57 and 58 formed integrally with the base plate 9. It will be apparent that the stop screws 55 and 56 determine the limits of movement of the lever member 47. The lever member 47 also is provided with a second forward extension 60 which is located on the opposite side of the instrument and which extends through an opening 61 in the base plate 9 and is secured to a spring 62 attached to an ear 63 forming part of the base plate. This spring 62 urges the lever member 47 in a clockwise direction thereby tending to collapse the bellows 40. By this arrangement when the air pressure within the bellows 40 is zero the spring 62 will rotate the lever member 47 for causing the portion 53 to engage the stop screw 56. When maximum air pressure is applied to the bellows 40, this bellows will rotate the lever member 47 against the action of spring 62 until the portion 53 engages the stop screw 55. For intermediate values of pressure applied to the bellows 40 the lever member 47 will assume intermediate positions between these two extreme positions.

The lever member 47 also is provided with an upstanding extension 65 which is attached by a pin 66 to a link 67 which extends forwardly through an opening 68 in the base plate 9 and is attached to a lever arm 69 which rotates the adjusting screw 20. This link 67 may be attached to the lever arm 69 by means of a pin 70 carried by the link and spring member 71 which is also carried by this link. It will be apparent that rotation of the lever member 47 due to expansion or contraction of the bellows 40 will rotate the lever arm 69 and thus the adjusting screw 20. For instance upon an increase in pressure applied to the bellows 40, the lever member 47 will be rotated counter-clockwise about its pivot which pulls the link 67 to the left as seen in Figure 1 and rotates the adjusting screw 20 in a direction for raising the control point of the instrument. If desired the lever arm 69 may be provided with a plurality of holes for receiving the pin 70 of connecting link 67. This arrangement provides for ready adjustment of the variation in control range for a given change in pressure within the bellows 40.

The instrument may be provided with the usual cover 75 which is secured to the base plate by means of screws 76 and 77 threaded in ears 78 and 79 forming a part of the base plate. This cover 75 may include the usual slots 80 for permitting the passage of air in contact with the thermostatic element, and also may be provided with a window 81 for indicating the setting of the thermostat.

While the drawing illustrates the instrument designed in a manner to cause rise in control point upon increase in applied pressure from the master control line, it will be apparent that by changing the position of the portion 65 of lever 47, or by utilizing a reversely threaded adjusting screw 20 the control point can be caused to lower upon increase in applied pressure.

From the foregoing description it will be apparent that I have provided a space condition controller which is adapted for automatic adjustment or for adjustment from a remote point, and which by concealment of the adjusting motor in the wall behind the instrument presents a very neat and attractive appearing exterior. As various modifications which are within the scope of my invention will appear to those skilled in the art I desire to be limited only by the scope of the appended claims.

I claim as my invention:

1. A space condition controller adapted for mounting upon a wall, comprising a wall box occupying an opening in said wall, said wall box having an open side positioned substantially flush with the wall surface, a base member mounted upon the wall, said base member at least partly covering the open side of said wall box and being secured to said wall box, a condition responsive element mounted upon said base member on the side thereof remote from said wall box so as to be exposed to the air in said space, a control device actuated by said condition responsive element, said element and said control device cooperating to form an automatic controller for maintaining a predetermined standard of the condition in the space in which the controller is located, adjusting means for varying the standard of the condition maintained by said controller, motor means mounted upon the other side of the base member and in said wall box, and connecting means extending from said motor means laterally of said base member to said adjusting means for thereby providing actuation of said adjusting means by said motor means.

2. A space condition controller adapted for mounting upon a wall, comprising a wall box occupying an opening in said wall, said wall box having an open side positioned substantially flush with the wall surface, a base member mounted upon the wall, said base member at least partly covering the open side of said wall box and being secured to said wall box, a condition responsive element mounted upon said base member on the side thereof remote from said wall box so as to be exposed to the air in said space, a control valve mounted upon said base member, a lever mechanism between said element and said control valve whereby said control valve is actuated by said condition responsive element, said element, said lever mechanism and said control valve forming an automatic condition controller for maintaining a predetermined standard of the condition in the space in which the controller is located, adjusting means for adjusting the standard of the condition maintained by said controller, an expansible and contractible diaphragm mounted on said base member and located in said wall box, and connecting means actuated by said diaphragm and extending from the interior of said wall box laterally of said base member to said adjusting means for actuating said adjusting means.

NORMAN A. METZGER.

CERTIFICATE OF CORRECTION.

Patent No. 2,203,631.  June 4, 1940.

NORMAN A. METZGER.

It is hereby certified that error appears in the printed specification of the above numbered patent requiring correction as follows: Page 2, second column, line 52, claim 1, before "controller" insert --condition--; and that the said Letters Patent should be read with this correction therein that the same may conform to the record of the case in the Patent Office.

Signed and sealed this 30th day of July, A. D. 1940.

(Seal)

Henry Van Arsdale,
Acting Commissioner of Patents.